United States Patent
Tai

(10) Patent No.: US 11,536,668 B2
(45) Date of Patent: Dec. 27, 2022

(54) APPARATUS FOR USE IN AN AUTOMATED OPTICAL INSPECTION

(71) Applicant: Vitrox Technologies Sdn. Bhd., Simpang Ampat (MY)

(72) Inventor: Zheng Yang Tai, Pendang (MY)

(73) Assignee: Vitrox Technologies Sdn. Bhd., Simpang Ampat (MY)

(*) Notice: Subject to any disclaimer, the term of this patent is extended or adjusted under 35 U.S.C. 154(b) by 0 days.

(21) Appl. No.: 17/348,103

(22) Filed: Jun. 15, 2021

(65) Prior Publication Data

US 2022/0011239 A1   Jan. 13, 2022

(30) Foreign Application Priority Data

Jul. 9, 2020 (MY) .......................... PI2020003567

(51) Int. Cl.
  *G01N 21/88*   (2006.01)
  *G06T 7/00*   (2017.01)

(52) U.S. Cl.
  CPC ....... *G01N 21/8806* (2013.01); *G06T 7/0004* (2013.01)

(58) Field of Classification Search
  CPC .......................... G01N 21/8806; G06T 7/0004
  See application file for complete search history.

(56) References Cited

U.S. PATENT DOCUMENTS

| | | | |
|---|---|---|---|
| 6,598,994 B1* | 7/2003 | Tait | G01N 21/8806 362/249.05 |
| 6,633,328 B1 | 10/2003 | Byrd et al. | |
| 6,948,823 B2 | 9/2005 | Pohlert et al. | |
| 7,641,365 B2* | 1/2010 | Katzir | G02B 19/0028 359/708 |
| 8,138,690 B2 | 3/2012 | Chemel et al. | |
| 11,143,860 B1* | 10/2021 | Lentz | G02B 1/005 |
| 2009/0103194 A1* | 4/2009 | Chen | G02B 7/08 359/823 |
| 2018/0252646 A1* | 9/2018 | Ying | G01N 21/6456 |

FOREIGN PATENT DOCUMENTS

CN   204330609   5/2015

OTHER PUBLICATIONS

English Abstract of CN204330609.

* cited by examiner

*Primary Examiner* — Hung V Nguyen
(74) *Attorney, Agent, or Firm* — Preston Smirman; Smirman IP Law, PLLC

(57) ABSTRACT

An apparatus for use in an automated optical inspection in a production line, the apparatus including a frame accommodating a plurality of illumination units surrounding an integrated optical imaging unit, wherein each illumination unit is rotatable in a synchronized manner relative to each unit, in use, to vary an illumination angle at an intended target, to enhance the visualization of the intended target captured by the optical imaging unit.

8 Claims, 4 Drawing Sheets

APPARATUS FOR USE IN AN AUTOMATED OPTICAL INSPECTION

CROSS-REFERENCE TO RELATED APPLICATION

The instant application claims priority to Malaysia Patent Application Serial No. PI2020003567 filed Jul. 9, 2020, the entire specification of which is expressly incorporated herein by reference.

FIELD OF THE INVENTION

The present invention relates to an apparatus for use in an automated optical inspection, more particularly in a production line for inspection of industrial products.

BACKGROUND OF THE INVENTION

There are a number of automated optical inspection (AOI) solutions in the industry that help to perform vision inspection on various industrial products such as printed circuit boards, semiconductors, automotive components, medical equipment and many more. Further, automated optical inspections are also widely deployed in industries which manufacture consumer products such as mobile phones, bottles, containers, gloves and so forth. Nevertheless, most of the inspection solutions are product-oriented and are unable to cover all forms of defects specifications under a single lighting configuration and camera system. Furthermore, multiple layers or angles of lighting with various colours are usually integrated into the inspection systems to maximise the inspection coverage, in addition to having motorised cameras that is able to inspect surfaces at different heights. The few challenges faced by existing automated optical inspection solutions include being product-oriented, defect-oriented, require multiple inspection stations for conducting full inspection coverage which in turn will incur additional cost, and limited flexibility in terms of viewing angles.

Many technologies related to automated optical inspection have been proposed to further improve the system. For example, a Chinese patent with publication no. CN204330609U discloses a utility model for the automated optical inspection process which employs the use of a six axis robot for conducting the inspection. According to the document, the six axis robot comprises an integrated camera with a standard camera lens, a light source system and a power supply system, wherein the robot is able to vary the height and viewing angle of the camera accordingly in order to inspect a defect on an object of interest. A United States patent with publication no. US663332 discloses a surgical video system for capturing an image of a surgical procedure and subsequently display the image on a video monitor remotely from the surgical procedure, wherein the surgical video system comprises a circular housing with an integrated camera in the centre of the housing and the camera is surrounded by a plurality of light sources to focus the distribution of light on the object of interest, similarly in design to existing apparatus employed for automated optical inspection purposes. Another United States patent with publication no. U.S. Pat. No. 6,948,823 discloses a lighting effects system comprising an arrangement of lamp elements, such as light emitting diodes (LEDs) or other light elements on a panel or frame. The panel or frame may be relatively lightweight, and may include one or more circuit boards for direct mounting of the lamp elements. Further, the panel or frame may have an opening through which a camera can view and the camera is assembled onto the panel or frame by a mounting bracket. The document also discloses that the lamp elements may be electronically controllable so as to provide differing intensity levels, collectively, individually, or in designated groups, and may be strobed, dimmed or otherwise controlled according to manually selected or programmable patterns. Another technology as disclosed in a United States patent with publication number U.S. Pat. No. 8,138,690 recites an improved LED-based lighting systems comprising fixtures with one or more rotatable LED light bars, integrated sensors, on-board intelligence to receive signals from the LED light bars and control the LED light bars, and a mesh network connectivity to other fixtures. The configuration shows a lighting system with the capabilities of illuminating several areas at once, allowing for a wider coverage of light or a greater concentration of light when all of the LED light bars are angled towards a specific area of interest.

The aforementioned patent documents describe the many configurations of an apparatus for use in inspection purposes. A major drawback arises therefrom as the apparatus in use are either fixed in place or have limited illumination options or viewing angles. No apparatus have been able to adjust the illumination angle independently to the body of the apparatus to adapt to the viewing angle of the integrated camera.

There exists a need to provide an apparatus of such configuration, particularly being able to rotate a plurality of illumination units disposed on the apparatus relative to each other and vary the illumination angle at an intended target when in use, not excluding enhancing the image taken by the integrated camera.

SUMMARY OF THE INVENTION

The present invention discloses an apparatus for use in an automated optical inspection in a production line, the apparatus comprising a frame accommodating a plurality of illumination units surrounding an integrated optical imaging unit, wherein each illumination unit is rotatable in a synchronized manner relative to each unit, in use, to vary an illumination angle at an intended target, to enhance the visualization of the intended target captured by the optical imaging unit.

Preferably, each illumination unit includes a bar light comprising a plurality of LEDs.

Preferably, each illumination unit is rotatable in a synchronized manner by means of a motorised gear system.

Preferably, gears in the motorised gear system are interchangeable with magnetic gears for non-contact driving of the motorised gear system, or with a belt driving mechanism.

Preferably, each illumination unit rotates at an angle from 0 to 90 degrees.

Preferably, the illumination units can be triggered separately with individual switches for each illumination unit.

Preferably, the optical imaging unit comprises a digital camera integrated with a varifocal lens positioned at the centre of the apparatus for adjusting focus on the intended target.

Preferably, the varifocal lens includes a liquid lens, motorised focusing lens or vibration resonance technology, such that the optical imaging unit is able to perform auto focusing of the intended target.

Preferably, the apparatus is adapted for mounting to a multi-axis robot by means of a robot end effector.

One skilled in the art will readily appreciate that the present invention is well adapted to carry out the objects and obtain the ends and advantages mentioned, as well as those inherent therein. The embodiment described herein is not intended as limitations on the scope of the invention.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

DETAILED DESCRIPTION OF THE INVENTION

Hereinafter, the invention shall be described according to the preferred embodiments of the present invention and by referring to the accompanying description and drawings. However, it is to be understood that limiting the description to the preferred embodiments of the invention is merely to facilitate discussion of the present invention and it is envisioned that those skilled in the art may devise various modifications without departing from the scope of the appended claim.

The present invention will now be described in greater detail with reference to the drawings.

Figure 1:
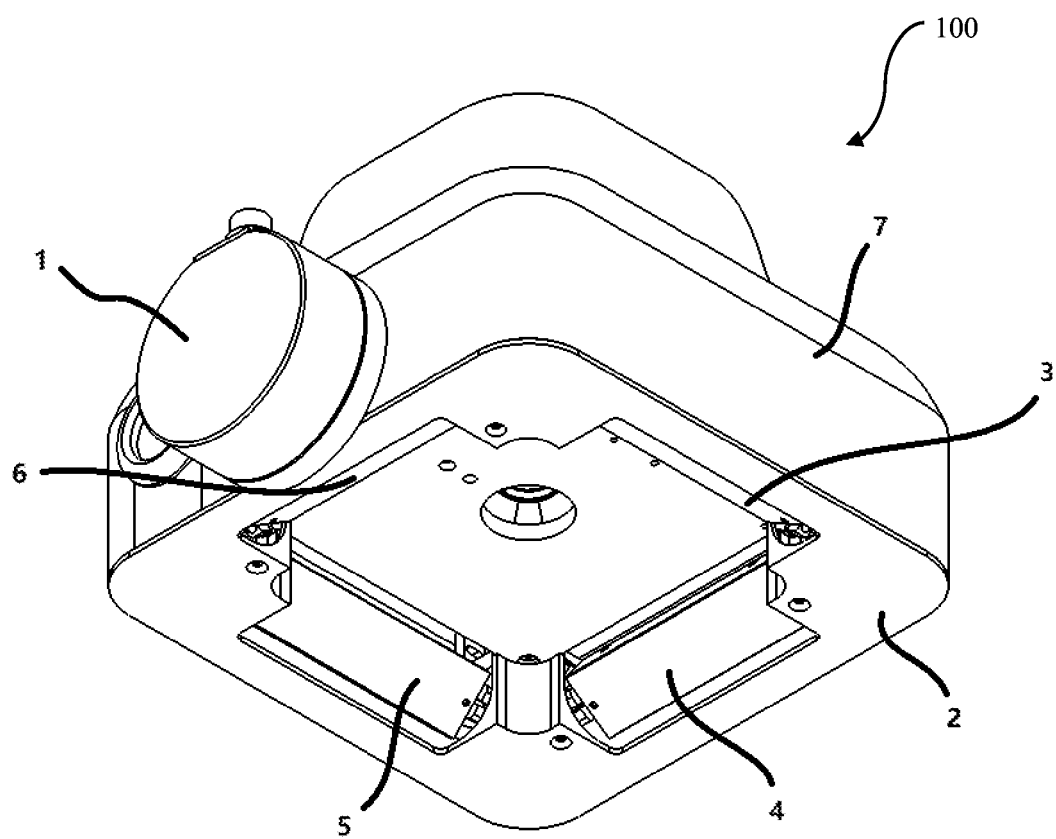
FIG. 1 illustrates a front view of an apparatus for use in an automated optical inspection according to the present invention.

FIG. 1 illustrates a perspective view of an apparatus 100 for use in an automated optical inspection according to the present invention. The apparatus 100 as illustrated comprises a front enclosure 2 and rear enclosure 7, with the front enclosure 2 having a plurality of apertures disposed along the sides for disposing a plurality of illumination units 3, 4, 5, 6, in addition to a centre aperture for disposing an optical imaging unit 12. Preferably, both the front enclosure 2 and rear enclosure 7 may be made out of lightweight metal or lightweight polymer which may be manufactured via 3D printing, injection moulding, die casting, sheet metal stamping or the likes. In addition, the front enclosure 2 prevents any environmental impurities such as dirt, dust or liquid from entering the apparatus 100 while the rear enclosure 7 protects the internal components from any potential accidental damages caused by user error in the handling of the apparatus 100. In a preferred embodiment, the illumination units 3, 4, 5, 6 may include a plurality of light bars which further comprises a plurality of light emitting diodes (LEDs) integrated into the housing of the light bar. The LEDs in the illumination units 3, 4, 5, 6 may be interchangeable with an assortment of diodes such as, by way of example but not limited to, RGB tricolour LEDs, UV or Infrared Ray emitting diodes or bulbs, and many more, to adapt to different applications when necessary. In addition, the illumination units 3, 4, 5, 6 may also be replaced with other lighting options, for example, spotlights, lasers, or projectors, according to the application in which the apparatus 100 is being used for. According to a preferred embodiment, the apparatus 100 is also adapted for mounting onto a multi-axis robot by means of a robot end effector 1, wherein the multi-axis robot is then able to displace the apparatus 100 to a desired angle and position during the inspection process. Advantageously, the apparatus 100 attached to the multi-axis robot is then able to ascertain a wider coverage of defects to be inspected as certain defects require the apparatus 100 to be at a predetermined angle in order to ensure an accurate visualization of the defect on an inspected product in view. Preferably, the illumination units 3, 4, 5, 6 are further classified relative to the position of the robot end effector 1, whereby the illumination units 3, 4, 5, 6 are classified as a north unit 6, south unit 4, east unit 3, and west unit 5, in which each illumination unit 3, 4, 5, 6 is able to illuminate each direction respectively. In another preferred embodiment, the apparatus 100 may include a wired or wireless communication means for controlling the apparatus 100, by way of example, an operator is able to control the apparatus 100 from an external computer or mobile device in connection with the apparatus 100 or multi-axis robot holding the apparatus 100 therewith.

Figure 2:
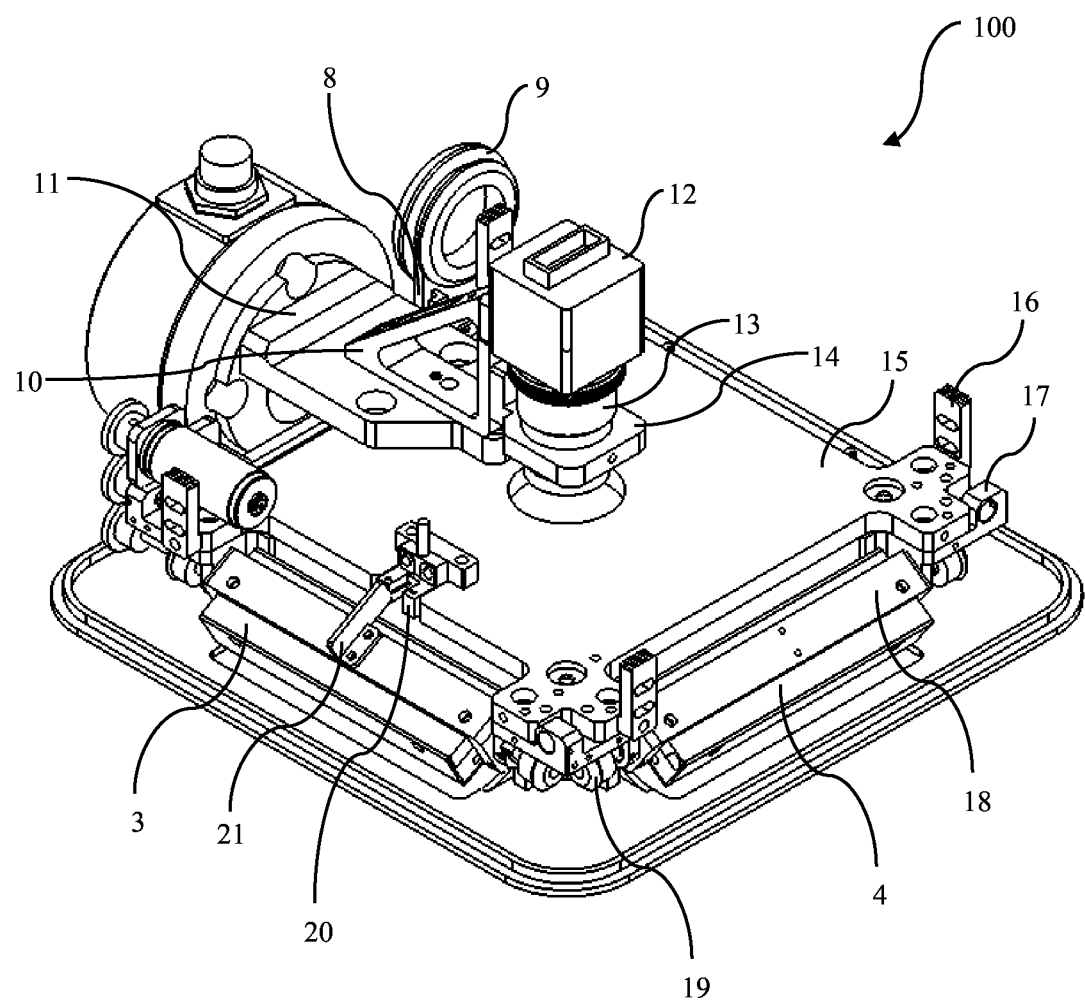
FIG. 2 illustrates a preferred embodiment of the apparatus without a rear enclosure according to the present invention.

FIG. 2 illustrates a preferred embodiment of the apparatus 100 without a rear enclosure according to the present invention. The apparatus 100 in use further comprises a plurality of components which function with respect to each other, as illustrated in FIG. 2. One of the main components in the apparatus 100 is a lighting base 15 which is the main base onto which all other components are assembled onto. The lighting base 15 may be manufactured from a lightweight metal, plastic or the likes and has a plurality of apertures disposed therealong the lighting base 15 for mounting of the other components, wherein the lighting base 15 is also fabricated with side grooves that accommodate to the shape and size of the illumination units 3, 4, 5, 6. Preferably, the lighting base 15 is thick enough to be able to withstand the load of the component assembly. Further, the lighting base 15 is attached to a lighting holder 11 which functions by not only connecting the lighting base 15 to the robot end effector 1, but also for attaching a camera holder 10 disposed on top of the lighting holder 11, whereby the camera holder 10, secures an optical imaging unit 12 in place. Preferably, adjacent to the robot end effector 1 is a cable bushing 9 which protects the cables connecting all the components attached to the lighting base from potential damages due to sharp edges, and a cable bushing cover 8 to hold the cable bushing 9 in place.

According to a preferred embodiment, the optical imaging unit 12 comprises a digital camera with an integrated varifocal lens 13, whereby the varifocal lens 13 is held in place by a lens holder 14 and is thusly positioned at the centre of the apparatus 100. The varifocal lens 13 is a type of camera lens with variable focal length in which focus changes as focal length and magnification changes, and are used for image display and capture, with recent technologies employing varifocal displays for virtual reality applications. Preferably, the varifocal lens 13 may include being integrated with a liquid lens, which uses one or more fluids to create an infinitely-variable lens without any moving parts by controlling the meniscus of the fluid, a motorised focusing lens which allows a user to control the focus and zoom functions remotely, or having a vibration resonance technology to perform auto focusing at different planes of inspection. Optionally, the varifocal lens 13 may be replaced with a zoom lens or other standard camera lenses for use in various applications.

In a preferred embodiment, the illumination units 3, 4, 5, 6 are held in place by light bar holders 18 which are attached to each side of the lighting base 15, wherein each light bar holder 18 is interconnected by a pairing of miter gears 19 at each ends thereof, with the exception of the east unit 3, wherein one end is attached to a motorised gear system which functions to allow the illumination units 3, 4, 5, 6 to rotate at a predetermined angle of rotation in a synchronized manner relative to each illumination unit 3, 4, 5, 6. Miter gears 19 are a special type of bevel gears that have equal numbers of teeth, wherein shafts of the miter gears 19 are positioned at right angles from each other, and the miter gears 19 have matching pitch surfaces and angles, usually with a conically-shaped pitch surface. Further, miter gears 19 are used for transmitting rotational motion at a 90-degree angle with a 1:1 ratio, whereby all input and output motion are equal. As such, each illumination unit 3, 4, 5, 6 is able to rotate in the same direction relative to each other during operation. However, regardless of the angle in which the illumination units 3, 4, 5, 6 are in, the illumination units 3, 4, 5, 6 will return to their original position by means of a slot sensor 20 and sensor flag 21 which are connected to the motorised gear system, wherein the sensor flag 21 is mounted onto the east unit 3 and functions by triggering the slot sensor 20 to initiate a homing process, which in turn will trigger the motorised gear system to rotate the illumination units 3, 4, 5, 6 back to their original position during an idle state. Optionally, the miter gears 19 may be replaced with magnetic gears without teeth for non-contact driving, or with a belt driving mechanism of the illumination units 3, 4, 5, 6, or similar mechanisms that may be used to transfer rotary motion. Further, the slot sensor 20 may also be interchangeable with a proximity sensor or other optical sensing components to determine the position of the illumination units 3, 4, 5, 6 and conduct the homing process accordingly. In a preferred embodiment, the cables connecting the illumination units 3, 4, 5, 6 to a power supply are secured by a plurality of cable holders 16 disposed on each corner of the lighting base 15, wherein the cable holders 16 aid in preventing cable slippages when the illumination units 3, 4, 5, 6 rotate during operation. Attached underneath the lighting base 15 just adjacent to the cable holders 16 are a plurality of bearing housings 17, having apertures for housing ball bearings to further enhance the rotation of each illumination unit 3, 4, 5, 6. The purpose of employing ball bearings is to reduce rotational friction and support radial and axial loads and can be achieved by at least two races to contain the balls and transmit the loads through the balls. Preferably, balls bearings may be made from materials including stainless steel, chrome steel or ceramic and have various designs to accommodate for different applications, which will be discussed further herein.

Figure 3:
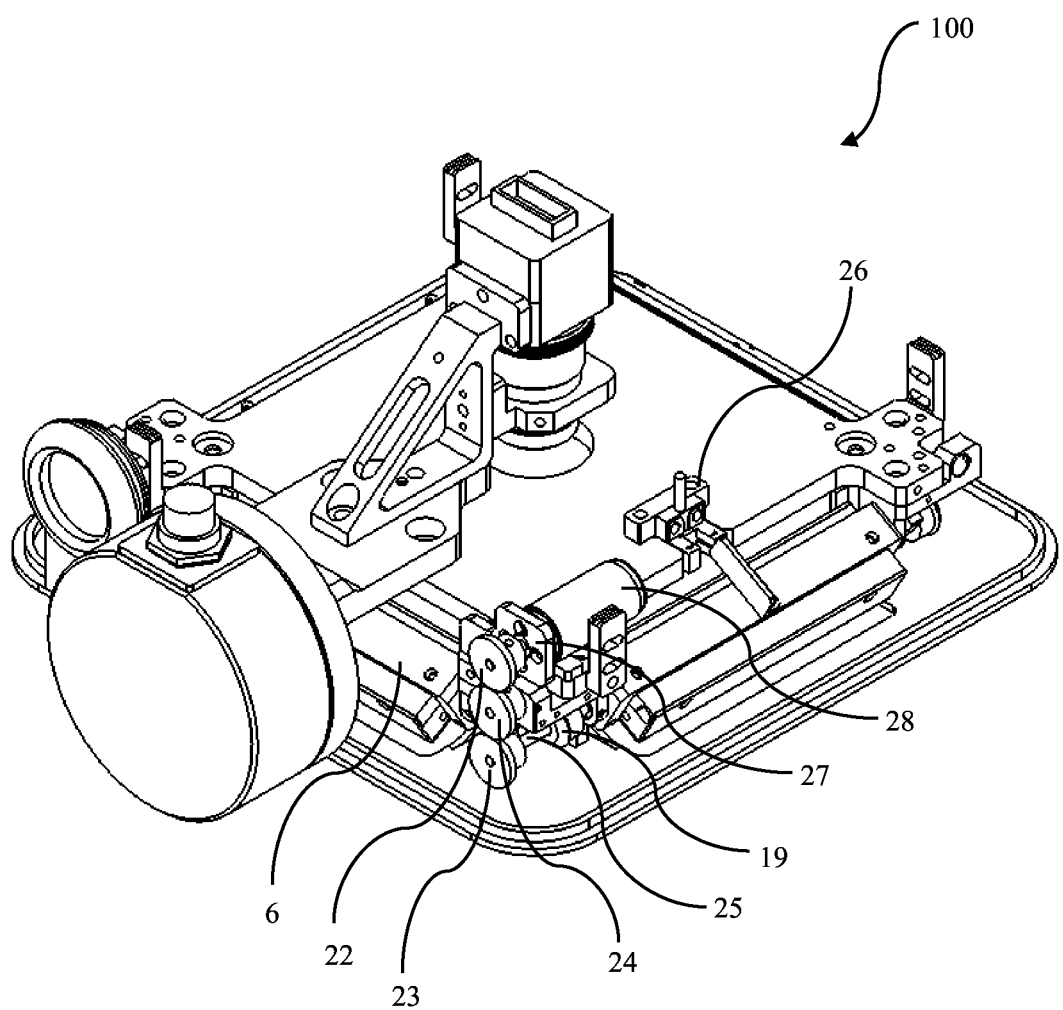
FIG. 3 illustrates a preferred embodiment of a motorised gear system according to the present invention.

FIG. 3 illustrates a preferred embodiment of the motorised gear system according to the present invention. The motorised gear system as illustrated in FIG. 3 comprises a stepper motor 28 with its shaft connected to a driving spur gear 22 and a driven spur gear 23, with an idling spur gear 24 sandwiched in between the driving spur gear 22 and driven spur gear 23. The spur gears 22, 23, 24 are a type of cylindrical gear, with shafts that are parallel and coplanar, and teeth that are straight and oriented parallel to the shafts. Spur gears 22, 23, 24 are arguably the simplest type of gear to be used for a wide range of applications albeit used for lower speed applications, although they can be used at almost any speed. Preferably, the stepper motor 28 is held in place by a motor holder 27 disposed at one end of the east unit 3 and is perpendicular to the lighting base 15. In a preferred embodiment, the power supply provides the stepper motor 28 with electricity to generate rotary motion which is subsequently transferred to the driving spur gear 22, idling spur gear 24, and driven spur gear 23, in which the driven spur gear 23 finally transfers the rotary motion to a driven shaft 25 which is connected to the east unit 3, allowing for the rotation of the east unit 3 and the other illumination units 3, 4, 5, 6 to occur simultaneously. In an alternative embodiment, the driving spur gear 22, idling spur gear 24, and driven spur gear 23 may be replaced by non-contact magnetic gears which resemble traditional mechanical gears in geometry and function but are advantageous by means of leak proof mechanical couplings, shear proof mechanical couplings, and wear is limited only to bearings, not mating contact surfaces of the gears. Alternatively, a belt driving mechanism may also be a suitable replacement for the driving spur gear 22, idling spur gear 24, and driven spur gear 23. The stepper motor 28 may also be interchangeable with various other driving engines such as brushless DC motors which are similar in configuration with the stepper motor 28 but can operate at higher speeds while maintaining the same level of torque, or a servo motor which is an electrical device which can push or rotate an object with high precision and is adapted to run on both alternating current and direct current, adding to the versatility of the servo motor.

Figure 4:
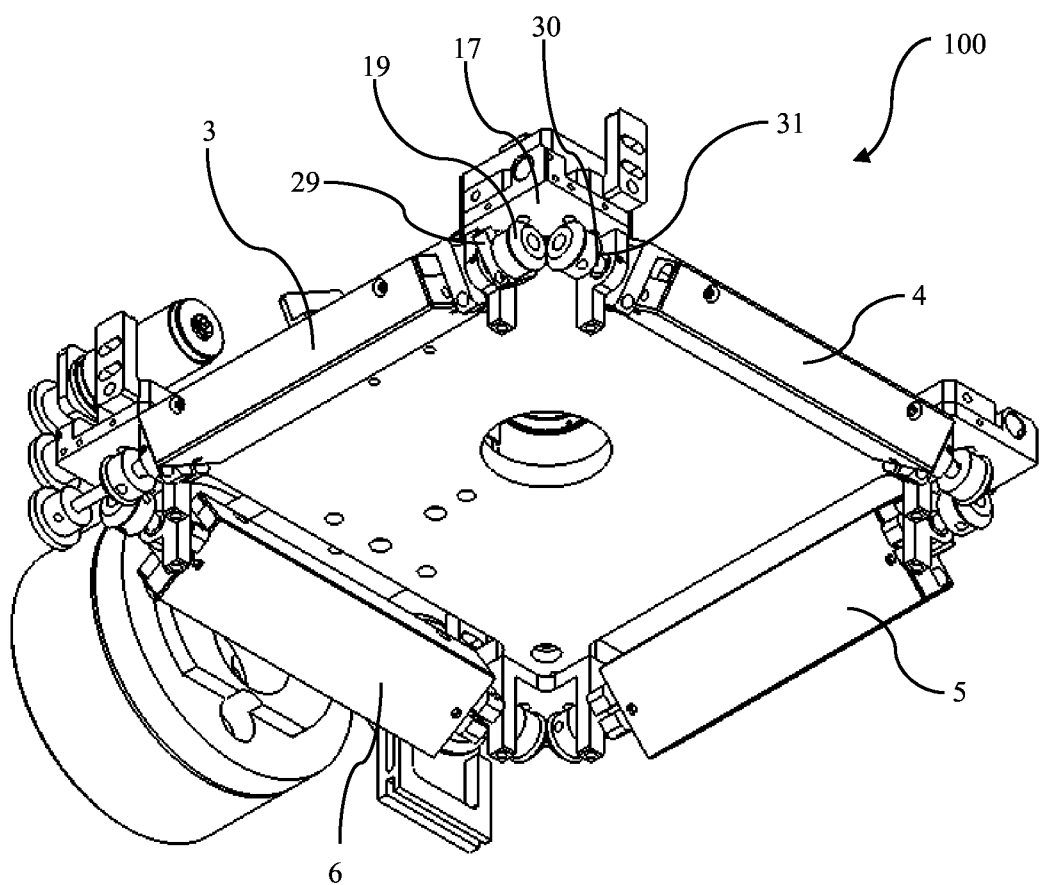
FIG. 4 illustrates a bottom perspective view of the apparatus without a front enclosure according to the present invention.

FIG. 4 illustrates a bottom perspective view of the apparatus 100 without a front enclosure according to the present invention. In order to prevent the illumination units 3, 4, 5, 6 from over rotating, a hard stopper 29 is employed and fitted adjacent to the miter gears 19. The hard stopper 29 functions by limiting the rotation of the illumination units 3, 4, 5, 6 to only rotate between 0 to 90 degrees, allowing for not only a wide illumination coverage; but also a greater intensity of light concentration when angled towards an area of interest. In a preferred embodiment, the illumination units 3, 4, 5, 6 may be triggered separately by separate switches for each illumination unit 3, 4, 5, 6, in use, providing additional flexibility in illumination during the inspection process. One application example is the inspection of a scratch on specular and non-specular surfaces, wherein the specular surface is known as the surface from which each point on the surface is level with another point, also defined as a near-perfect flat surface, whereas a non-specular surface is the opposite whereby each point on the surface is on a different level than another point. For non-specular surfaces, taking a metallic surface as an example, an optimum illumination angle of each illumination unit 3, 4, 5, 6 to highlight the defect may be between 30 to 45 degrees, and the position of the apparatus 100 should be approximately between 50 to 70 mm from the non-specular surface. However, for specular surfaces, the optimum illumination angle of each illumination unit 3, 4, 5, 6 may be between 15 to 25 degrees and the illumination position has to be very close to the surface of inspection, approximately 5 to 10 mm, in order to highlight the inspected defect. By way of example of a more complex scenario, whereby a product may be metallic but with a thin piece of transparent glass disposed on top of the metallic surface, and the defect to be inspected is a scratch on the glass. In order to highlight the defect, the illumination angle of each illumination unit 3, 4, 5, 6 may be between 70 to 80 degree and the apparatus 100 will have to be at a distance between 60 to 70 mm from the inspection surface for the scratch to be accurately inspected. Considering the many scenarios mentioned and unmentioned, the apparatus 100 is well equipped with the means for inspecting a wide range of defects due to its flexibility in positioning and illumination angles.

As illustrated in FIG. 4, the miter gears 19 are connected to the illumination units 3, 4, 5, 6 via a connecting shaft 30 which also functions holds the miter gears 19 in position and transfer the rotary motion from the miter gears 19 to the illumination units 3, 4, 5, 6 therewith. As illustrated prior in FIG. 2, attached underneath the lighting base 15 just adjacent to the cable holders 16 are a plurality of bearing housings 17, having apertures for housing ball bearings to further enhance the rotation of each illumination unit 3, 4, 5, 6. In a preferred embodiment, deep groove ball bearings 31 are employed to be disposed in the bearing housing 17, wherein the deep groove ball bearings 31 may be characterized by having deep raceway grooves in which the inner and outer rings have circular arcs of slightly larger radius than that of the balls and the rings are non-separable. The deep groove ball bearings 31, in use, are advantageous as compared to other ball bearing designs due to its capabilities in high speed application, good radial and axial load capacity, low torque capacity at start up and running speeds, and require little to no maintenance after installation. Preferably, the deep groove ball bearings 31 functions to facilitate the rotary motion of the illumination units 3, 4, 5, 6 during operation, by ensuring a smooth rotation of the connecting shaft 30 and miter gears 19 at all times.

The present disclosure includes as contained in the appended claims, as well as that of the foregoing description. Although this invention has been described in its preferred form with a degree of particularly, it is understood that the present disclosure of the preferred form has been made only by way of example and that numerous changes in the details of construction and the combination and arrangements of parts may be resorted to without departing from the scope of the invention.

What is claimed is:

1. An apparatus for use in an automated optical inspection in a production line, comprising:
   a main base accommodating:
      one or more illumination units;
      an optical imaging unit surrounded by the illumination units;
      a first set of gears that includes a plurality of spur gears in connection with at least a single illumination unit;
      a second set of gears that includes a plurality of miter gears, with each gear at least disposed between ends of two illumination units for interconnecting them; and
      a driving engine connected with the first set of gears;
      wherein the driving engine drives the first set of gears to rotate the single illumination unit for its rotational motion to be transferred to the other illumination units through the second set of gears, so that each illumination unit rotates in a synchronized manner relative to each other for an illumination angle directed towards an intended target to be varied as an image of the target is captured by the optical imaging unit during use.

2. The apparatus according to claim 1, wherein each illumination unit includes a bar light comprising a plurality of light emitting diodes.

3. The apparatus according to claim 1, wherein the gears are interchangeable with magnetic gears for non-contact driving, or with a belt driving mechanism.

4. The apparatus according to claim 1, wherein each illumination unit rotates at an angle from 0 to 90 degrees.

5. The apparatus according to claim 1, wherein the illumination units can be triggered separately with individual switches for each illumination unit.

6. The apparatus according to claim 1, wherein the optical imaging unit comprises a digital camera integrated with a varifocal lens positioned at the centre of the apparatus for adjusting focus on the intended target.

7. The apparatus according to claim 6, wherein the varifocal lens includes a liquid lens, motorised focusing lens or vibration resonance technology, such that the optical imaging unit is able to perform auto focusing of the intended target.

8. The apparatus according to claim 1, wherein the apparatus is adapted for mounting to a multi-axis robot by means of a robot end effector.

* * * * *